US011106501B2

(12) United States Patent
Burriss et al.

(10) Patent No.: US 11,106,501 B2
(45) Date of Patent: Aug. 31, 2021

(54) DYNAMIC MEMORY MANAGER

(71) Applicant: EMC IP HOLDING COMPANY LLC, Hopkinton, MA (US)

(72) Inventors: Michael L. Burriss, Raleigh, NC (US); Wai Yim, Merrimack, NH (US); William K. McGrath, Wake Forest, NC (US); Tharani McGuinness, Holly Springs, NC (US); Earle MacHardy, Durham, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 146 days.

(21) Appl. No.: 16/526,647

(22) Filed: Jul. 30, 2019

(65) Prior Publication Data

US 2021/0034422 A1   Feb. 4, 2021

(51) Int. Cl.
*G06F 9/46* (2006.01)
*G06F 9/50* (2006.01)
*G06F 12/02* (2006.01)

(52) U.S. Cl.
CPC .......... *G06F 9/5016* (2013.01); *G06F 9/5022* (2013.01); *G06F 12/023* (2013.01); *G06F 2209/5019* (2013.01)

(58) Field of Classification Search
CPC .... G06F 9/5016; G06F 9/5022; G06F 12/023; G06F 2209/5019
See application file for complete search history.

(56) References Cited

U.S. PATENT DOCUMENTS 10,423,459 B1 * 9/2019 Jacques de Kadt ...... G06F 9/50
2013/0173880 A1 * 7/2013 Foster .................... G06F 12/02
711/170

* cited by examiner

*Primary Examiner* — Gregory A Kessler
(74) *Attorney, Agent, or Firm* — Daly, Crowley, Mofford & Durkee, LLP (57) ABSTRACT

A method comprising: allocating a first memory pool and a second memory pool, the first memory pool being allocated to a first application, and the second memory pool being allocated to a second application; receiving a first request for additional memory, the first request being submitted by the second application; assigning a portion of the first memory pool to the second application, the portion of the first memory pool including a set of memory chunks that are part of the first memory pool, the assigning of the portion including updating a first data structure portion to associate the second application with set of memory chunks; and notifying the second application that the portion of the first memory pool has been assigned to the second application.

17 Claims, 7 Drawing Sheets

FIG. 2D $A_1, A_2, A_3, A_4, A_5, A_6, A_7, A_8, A_9, A_{10}, A_{11}, A_{12}, A_{13}, A_{14} \ldots A_K$ — 216
$B_1, B_2, B_3, B_4, B_5, B_6, B_7, B_8, B_9, B_{10}, B_{11}, B_{12}, B_{13}, B_{14} \ldots B_L$ — 218
$C_1, C_2, C_3, C_4, C_5, C_6, C_7, C_8, C_9, C_{10}, C_{11}, C_{12}, C_{13}, C_{14} \ldots C_M$ — 220

DYNAMIC MEMORY MANAGER

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method is provided comprising: allocating a first memory pool and a second memory pool, the first memory pool being allocated to a first application, and the second memory pool being allocated to a second application; receiving a first request for additional memory, the first request being submitted by the second application; assigning a portion of the first memory pool to the second application, the portion of the first memory pool including a set of memory chunks that axe part of the first memory pool, the assigning of the portion including updating a first data structure portion to associate the second application with set of memory chunks; and notifying the second application that the portion of the first memory pool has been assigned to the second application.

According to aspects of the disclosure, a system is provided, comprising: a memory; and one or more processors operatively coupled to the memory, the one or more processors being configured execute a memory management system, the memory management system being configured to perform the operations of: allocating a first memory pool and a second memory pool, the first memory pool being allocated to a first application, and the second memory pool being allocated to a second application; receiving a first request for additional memory, the first request being submitted by the second application; assigning a portion of the first memory pool to the second application, the portion of the first memory pool including a set of memory chunks that are part of the first memory pool, the assigning of the portion including updating a first data structure portion to associate the second application with set of memory chunks; and notifying the second application that the portion of the first memory pool has been assigned to the second application.

According to aspects of the disclosure, a non-transitory computer-readable medium is provided that stores one or more processor-executable instructions, which when executed by at least one processor cause the at least one processor to perform the operations of: allocating a first memory pool and a second memory pool, the first memory pool being allocated to a first application, and the second memory pool being allocated to a second application; receiving a first request for additional memory, the first request being submitted by the second application; assigning a portion of the first memory pool to the second application, the portion of the first memory pool including a set of memory chunks that are part of the first memory pool, the assigning of the portion including updating a first data structure portion to associate the second application with set of memory chunks; and notifying the second application that the portion of the first memory pool has been assigned to the second application.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

DETAILED DESCRIPTION

Before describing embodiments of the concepts, structures, and techniques sought to be protected herein, some terms are explained. In some embodiments, the term "I/O request" or simply "I/O" may be used to refer to an input or output request. In some embodiments, an I/O request may refer to a data read or write request.

Figure 1:
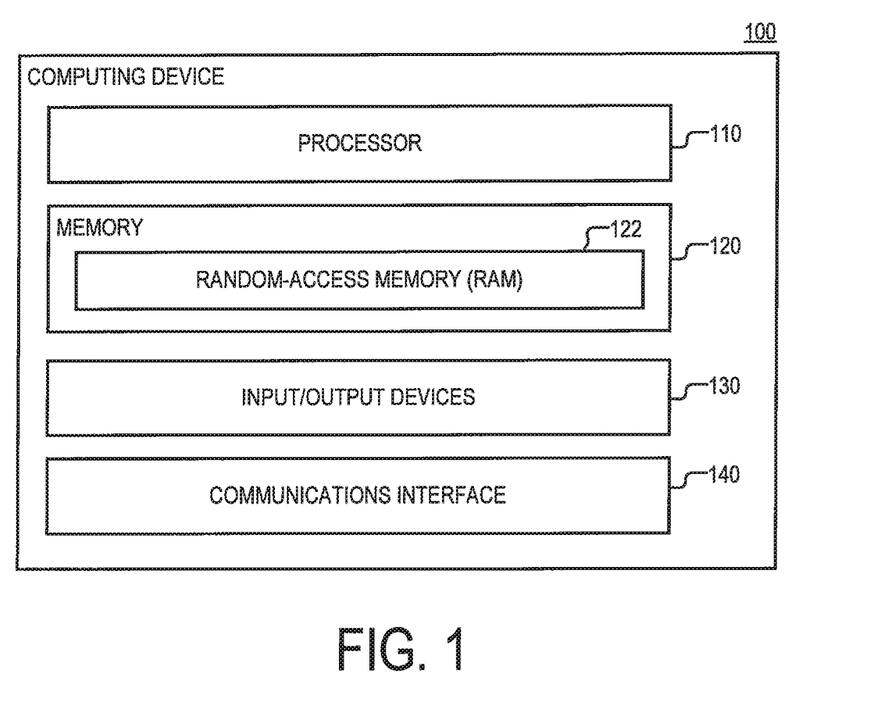
FIG. 1 is a diagram of an example of a computing device, according to aspects of the disclosure.

FIG. 1 is a diagram of an example of a computing device 100, according to aspects of the disclosure. According to the present example, the computing device is a node in a distributed storage system. However, alternative implementations are possible in which the computing device 100 includes a laptop computer, a desktop computer, a smartphone, a storage server, a storage system node, and/or any other suitable type of computing device. The computing device 100 may include a processor 110, a memory 120, an Input/Output (I/O) devices 130, and a communications interface 140. The processor may include one or more of a general-purpose processor (e.g., an x86 processor or an ARM-based processor), an Application-Specific Integrated Circuit (ASIC), a Field-Programmable Gate Array (FPGA), and/or any other suitable type of processing circuitry. The memory 120 may include any suitable type of volatile and/or non-volatile memory. In some implementations, the memory 120 may include a Random-a Hard Drive, a Solid-State Drive, an Electrically Erasable Programmable Read-Only Memory (EEPROM), a Flash Memory, a Solid-State Drive (SSD), and/or any other suitable type of memory. In some implementations, the memory 120 may include random-access memory (RAM) 122, as shown. The RAM 122 may be any of a volatile-RAM or a non-volatile RAM. The I/O devices 130 may include one or more of a mouse, a keyboard, a touch panel, a display device, a speaker, a microphone, and/or any other suitable type of I/O device. The communications interface may include an Ethernet interface, an 802.11 wireless interface, an InfiniBand interface, a Universal Serial Bus (USB) interface, a Bluetooth interface, and/or any other suitable type of communications interface.

Figure 2A:
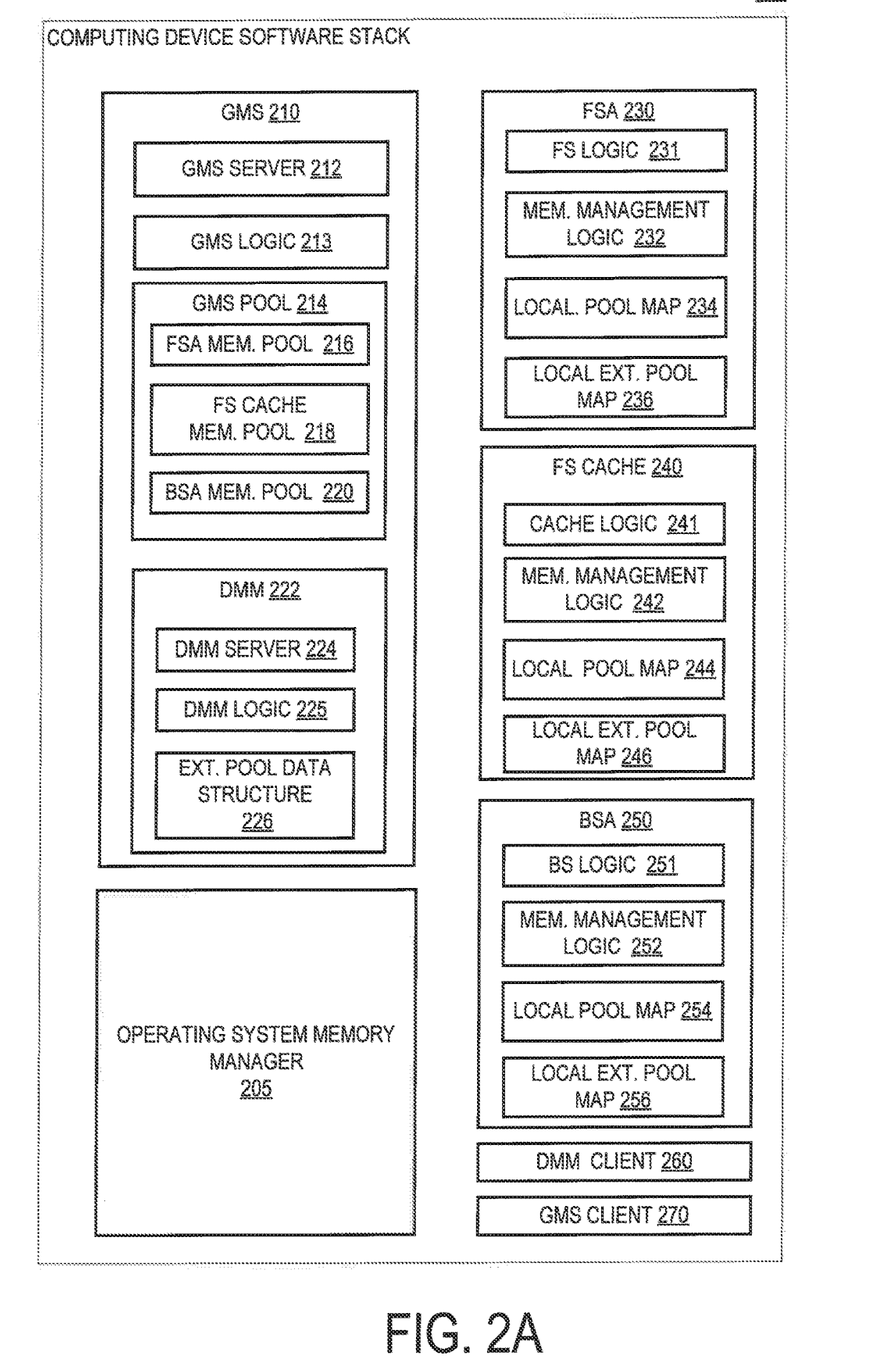
FIG. 2A is a diagram of an example of a software stack of the computing device, according to aspects of the disclosure.

FIG. 2A is a diagram of an example of a software stack 200 that is executed on the computing device 100. The software stack 200 may include an operating system memory manager 205, a Global Memory Subsystem (GMS) 210, a file service application (FSA) 230, a file service cache application (hereinafter "FS cache"), a block service application (BSA) 250, a DMM client 260, and a GMS client 270. Although in the example of FIG. 2A the FS cache 240 and the FSA 230 are depicted as separate blocks, it will be understood that that they can be integrated together. The term "application," as used throughout the disclosure, shall refer to any entity that is allocated a memory pool by the GMS 210, irrespective of how the entity is instantiated. For example, an application may include an executable routine, a process, a portion of a process, or a plurality of processes, etc. The term "logic", as used throughout the disclosure, may refer to logic that is implemented in software (e.g., one or more processor-executable instructions configured to perform one or more operations), logic that is implemented in hardware (e.g., electronic circuitry configured to perform one or more operations, or logic, that is implemented as a combination of software and hardware.

The operating system memory manager 205 may include one or more processes that are part of an operating system of the computing device 100, which are configured to allocate memory to different applications and/or processes that are executed on top of the operating system.

The GMS 210 may include a memory subsystem that is configured to provide memory management services to the FSA 230 and the BSA 250. The GMS 210 may include a GMS server 212, a GMS logic 213, a GMS pool 214, and a dynamic memory manager (DMM) 222. The DMM 222 may include a DMM server 224, a DMM logic 225, and an extended pool data structure 226. The GMS server 212 may be configured to receive requests that are submitted by the FSA 230, the FS cache 240, and the BSA 250 and forward the received requests to the GMS logic 213 and/or the DMM server 224. The GMS logic 213 may be configured to allocate memory pools for applications that are executed on the computing device 100. According to the present example, the GMS logic 210 is configured to allocate memory pools 216, 218, and 220, which are discussed in greater detail further below.

The DMM 222 may include a DMM server 224, DMM logic 225, and an extended pool data structure 226. The DMM server 224 may be configured to receive (via the GMS server 212) requests that are submitted by the FSA 230, FS cache 240, and the BSA 250 and forward those requests to the GMM logic 225. As is discussed further below, the requests may include: (i) a request to assign a portion of a first application's respective memory pool to a second application (i.e., a borrower application), and (ii) and a request to return the assigned portion back to the first application. In this regard, the DMM logic may be configured to: (i) assign a portion of a first application's respective memory pool to a second application, and (ii) return the assigned portion back to the first application when the first application submits a request to reclaim.

The GMS pool 214 may include a portion of the RAM 122 of the computing device 100, that has been allocated to the GMS 210 by the operating system memory manager 205. As illustrated, the GMS pool 214 may include a memory pool 216, a memory pool 218, and a memory pool 220. The memory pool 216 may include a portion of the GMS pool 214 that is allocated, by the GMS 210, to the FSA 230. The memory pool 218 may include a portion of the GMS pool 214 that is allocated, by the GMS 210, to the FS cache 240. And the memory pool 220 may include a portion of the GMS pool 214 that is allocated, by the GMS 210, to the BSA 250. Under the nomenclature of the present disclosure, the FSA 230 is said to be the owner of the memory pool 216, the FS cache 240 is said to be the owner of the memory pool 218, and the BSA 250 is the owner of the memory pool 220. Furthermore, according to the present disclosure, the term "memory pool" is used refer interchangeably to a set of memory chunks in RAM 122 or to a data structure that identifies the memory chunks.

The extended pool data structure 226 may include any suitable type of data structure that is arranged to map a portion of the memory pool of one application to another application. For instance, the extended pool data structure 226 may map a portion of the memory pool 216 to any of the FS cache 240 and the BSA 250. As another example, the extended pool data structure 226 may map a portion of the memory pool 218 to any of the FSA 230 and the BSA 250. As yet another example, the extended pool data structure 226 may map a portion of the memory pool 220 to any of the FSA 230 and the FS cache 240. In some implementations, the extended pool data structure 226 may be managed and/or updated by the DMM logic 225. The manner in which the extended pool data structure 226 is updated is discussed further below with respect to FIG. 3.

Under the nomenclature of the present disclosure, when a portion of a pool is mapped to an application that is not the pool's owner, that application is referred to as a "borrower" of the portion. For example, when a portion of the memory pool 216 is mapped to the FS cache 240, the FS cache 240 may be said to be a borrower of the portion. As another example, when a portion of the memory pool 218 is mapped to the BSA 250, the BSA 250 may be said to be a borrower of the portion.

According to aspects of the disclosure, when an application is a borrower of a portion of a memory pool, that application is allowed to use the portion for its own needs, and the owner of the memory pool is prevented for using the portion until the application (i.e., the borrower) has released the portion. For example, when the FS cache 240 is a borrower of a portion of the memory pool 216, the FS cadre 240 may be permitted to use the portion (in addition the FS cache's 240 own memory pool 218), and the FSA 230 may be denied permission to use the borrowed portion. As another, example when the BSA 250 is the borrower of a portion of the memory pool 218, the BSA 250 may be permitted to use the portion of the memory pool 218, and the PS cache 240 may be denied permission to use the borrowed portion.

According to aspects of the disclosure, when an application has borrowed memory from another application's memory pool, the former application (i.e., the borrower) may be requested to release the memory by the latter application (230). In response to such a request, the latter application (i.e., the borrower) may release the memory, after which the memory may again become available for use by the latter application (i.e., the memory owner). For example, when FS cache 240 has borrowed memory from BSA 250, the BSA 250 may submit (to the GMS 210) a request to reclaim the borrowed memory. The GMS 210 may then submit, to the FS cache 240, a request to release the borrowed memory. In response to receiving the request, the FS cache 240 may release the borrowed memory and notify the GMS 210 that the memory has been released. In response to receiving the notification, the GMS 210 may update the extended pool data structure 226 accordingly, and notify the BSA 250 that the memory is again available for use by the BSA 250. Upon receiving the notification, the BSA 250 may begin using the released memory.

In traditional systems, the size of the GMS pool 214 may be limited by hardware availability and/or various system policies that determine how much memory is to be allocated to the GMS 210 by the operating system memory manager 205. Furthermore, the size of any of the memory pools 216, 218, and 220 may be limited by the size of the GMS pool 214 and various other system policies that determine how much memory is to be allocated to the FSA 230, the FS cache 240, and the BSA 250. In some respects, modifying any such system policies carries the risk of disrupting various dependencies that exist within the software stack 200 and causing one or more applications in the stack 200 to run out of memory at one point during their execution.

The approach described herein allows the amount of memory that is available to any of applications 230-250 to be increased seamlessly, without the modification of wider system policies concerning the allocation of memory pools within the software stack 200. On the side of GMS 210, the approach may include: integrating the DMM 222 into the GMS 210, and configuring the DMM 222 (i) detect when memory is not used by an application, (ii) lend the memory to another application, and (iii) reclaim the memory when the former application needs it back. On the application side, the approach may further include configuring any of the applications in the software stack 200 to: (i) cede memory (in the application's memory pool) that is not being used, (ii) reclaim the ceded memory when necessary, and (iii) borrow additional memory when the application's memory pool is not sufficient to accommodate the execution of the application. Although this approach does not directly change the static allocation of memory pools within the memory stack 200, under most circumstances, the approach would enable applications to access a greater amount of memory (if they need to) than what is available in their statically allocated memory pools.

The FSA 230 may include a file service (FS) logic 231, a memory management logic 232, a pool map 234, and an extended pool map 236. The FS logic 231 may be configured to implement a data store for saving, retrieving, and updating files from a particular data volume (or another storage object). The memory management logic 232 may be configured to: (i) cause the GMS 210 to allocate the memory pool 216, (ii) cause the GMS 210 to assign a portion of another application's memory pool to the FSA 230, and (iii) cause the FS logic 231 to release a portion of another application's pool (i.e., a borrowed portion) that has been assigned to the FSA 230. The pool map 234 may include any suitable type of data structure that identifies one or more memory chunks that are part of the memory pool 216. In some implementations, the pool map 234 may include a list of all memory chunks that constitute the memory pool 216. The extended pool map 236 may identify any memory chunks that are part of the memory pool 218 and/or the memory pool 220, which have been borrowed by the FSA 230. In some implementations, the extended pool map 236 may include a list of all memory chunks that have been borrowed by the FSA 230.

The FS cache 240 may include a cache logic 241, a memory management logic 242, a pool map 244, and an extended pool map 246. The cache logic 241 may be configured to provide caching services to the FS logic 231. The memory management logic 242 may include logic that is configured to: (i) cause the GMS 210 to allocate the memory pool 218, (ii) cause the GMS 210 to assign a portion of another application's memory pool to the FS cache 240, and (iii) cause the cache logic 241 to release a portion of another application's pool (i.e., a borrowed portion) that has been assigned to the FS cache 240. The pool map 244 may include any suitable type of data structure that identifies one or more memory chunks that are part of the memory pool 218. In some implementations, the pool map 244 may include a list of all memory chunks that form the memory pool 218. The extended pool map 246 may identify any memory chunks that are part of the memory pool 216 and/or the memory pool 220, which have been borrowed by the FS cache 240. In some implementations, the extended pool map 246 may include a list of all memory chunks that have been borrowed by the FS cache 240.

The BSA 250 may include a block service logic 251, a memory management logic 252, a pool map 254, and an extended pool map 256. The block service logic 251 may be configured to provide block services to the FSA 230. Such block services may include interactions with various storage device drivers to store and retrieve data on behalf of the FSA 230. For example, in some implementations, the block service logic may include a mapped LUN (MLUN) driver, which is configured to map logical LUNs from a set or pool of physical LUNs. The memory management logic 252 may include logic that is configured to: (i) cause the GMS 210 to allocate the memory pool 220, (ii) cause the GMS 210 to assign a portion of another application's memory pool to the BSA 250, and (iii) cause, the block service logic 251 to release a portion of another application's pool (i.e., a borrowed portion) that has been assigned to the BSA 250. The pool map 254 may include any suitable type of data structure that identifies one or more memory chunks that are part of the memory pool 220. In some implementations, the pool map 254 may include a list of memory chunks that form the memory pool 220. The extended pool map 256 may identify any memory chunks that are part of the memory pool 216 and/or the memory pool 218, which have been borrowed by the BSA 250. In some implementations, the extended pool map 256 may include a list of all memory chunks that have been borrowed by the BSA 250.

In some implementations, the extended pool data structure 226 may be stored in the userspace of the computing device 100, whereas the extended pool maps 236, 246, and 256 may be stored in the kernel space in the computing device 100. However, it will be understood that the present disclosure is not limited thereto. Those of ordinary skill in the art will readily recognize that any of the extended pool data structure 226 and the extended pool maps 236, 246, and 256 may be stored in either of the userspace or the kernel space of the computing device 100. Although in the example of FIG. 2A the extended pool maps 236, 246, and 256 are depicted as separate blocks, alternative implementations are possible in which any of the extended pool maps 236 are integrated with one another. Although in the example of FIG. 2A the memory management logic 232, 242, and 252 are depicted as separate blocks, alternative implementations are possible in which any of the memory management logic 232, 242, and 252 are integrated with one another. Stated succinctly, the present disclosure is not limited to any specific logical division of the software stack 200.

The DMM client 260 may be configured to interact with the DMM server 224 (via GMS server 212 and GMS client 270). In some implementations, the DMM client 260 may include an application programming interface (API) for: (i) submitting (to the DMM server 224) a request to borrow memory (e.g., a request for additional memory) and (ii) submitting (to the DMM server 224) a request to reclaim memory that has been borrowed by another application (e.g., a request to reclaim memory). The GMS client 270 may be configured to interact with the GMS server 212. In operation, requests that are submitted to the DMM client 260 may be forwarded by the DMM client 260 to the GMS client 270. The GMS client 270 may then forward the requests to the GMS server 212. Upon receiving the requests, the GMS server 212 may forward the requests to the GMM server 224. The GMM server 224 may then forward the requests to the DMM logic 225 for further execution.

Figure 2B:
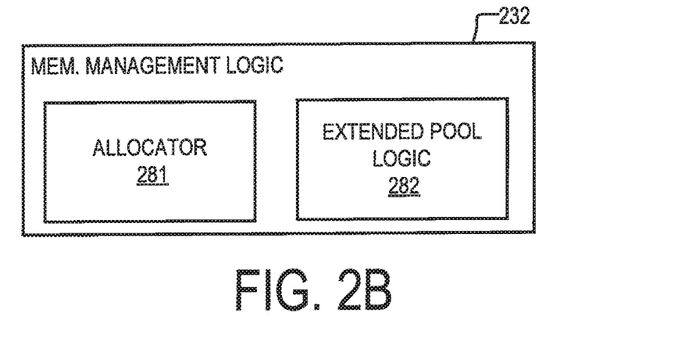
FIG. 2B is a diagram of an example of a memory management logic, according to aspects of the disclosure.

FIG. 2B shows an example of the memory management logic 232 in further detail. As illustrated, the memory management logic 232 may include a pool allocator 281 and an extended pool logic 282. The pool allocator 281 may include logic configured to interact with the GMS 210 to instantiate the memory pool 216. The extended pool logic 282 may be configured to interact with the DMM 222 to request additional memory for the FSA 230 and/or release memory that has been borrowed, from another application, by the FSA 230. In some implementations, the extended pool logic 282 may be configured to register with the DMM 222 in order to be able to participate in loaning out and reclaiming memory that is part of the memory pool 216. After the extended pool logic 282 has registered with the DMM 222, the extended pool logic 282 may monitor requests for memory that are made to the memory pool 216 by the FS logic 231, determine whether the memory pool 216 is beginning to run low on memory as a result of the requests, and, when necessary, reclaim memory chunks that are part of the memory pool 216, and which have been loaned out to other applications (e.g., FS cache 240 or BSA 250).

Figure 2C:
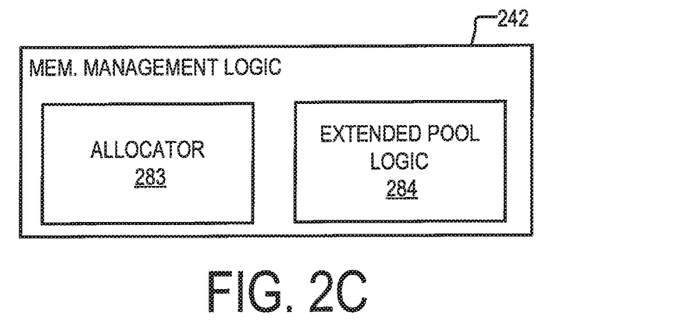
FIG. 2C is a diagram of an example of a memory management logic, according to aspects of the disclosure.

FIG. 2C shows an example of the memory management logic 242 in further detail. As illustrated, the memory management logic 232 may include a pool allocator 283 and an extended pool logic 284. The pool allocator 283 may include logic configured to interact with the GMS 210 to instantiate the memory pool 218. The extended pool logic 284 may be configured to interact with the DMM 222 to request additional memory for the BSA 250 and/or release memory that is borrowed, from another application, by the BSA 250. In some implementations, the extended pool logic 284 may be configured to register with the DMM 222 in order to be able to participate in loaning out and reclaiming memory that is part of the memory pool 218. After the extended pool logic 284 has registered with the DMM 222, the extended pool logic 284 may monitor requests for memory that are made to the memory pool 218 by the cache logic 241, determine whether the memory pool 218 is beginning to run low on memory as a result of the requests, and, when necessary, reclaim memory chunks that are part of the memory pool 218, and which have been loaned out to other applications (e.g., BSA 250 or FSA 230).

Figure 2D:
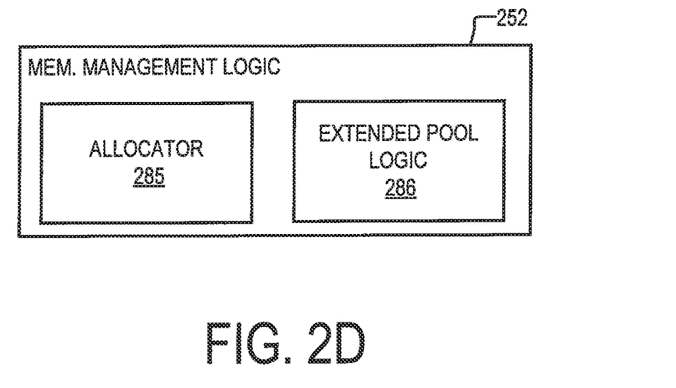
FIG. 2D is a diagram of an example of a memory management logic, according to aspects of the disclosure.

FIG. 2D shows an example of the memory management logic 252 in further detail. As illustrated, the memory management logic 252 may include a pool allocator 285 and an extended pool logic 286. The pool allocator 285 may include logic configured to interact with the GMS 210 to instantiate the memory pool 218. In some implementations, the extended pool logic 286 may be configured to interact with the DMM 222 to request additional memory for the BSA 250 and/or release memory that is borrowed, from another application, by the BSA 250. In some implementations, the extended pool logic 286 may be configured to register with the DMM 222 in order to be able to participate in loaning out and reclaiming memory that is part of the memory pool 220. After the extended pool logic 286 has registered with the DMM 222, the extended pool logic 286 may monitor requests for memory that are made to the memory pool 220 by the BS logic 2251, determine whether the memory pool 220 is beginning to run low on memory as a result of the requests, and, when necessary, reclaim the memory chunks that are part from the memory pool 220, and which have been loaned to other applications (e.g., FS cache 240 or FSA 230.

Although in the example of FIGS. 2A-D, the extended pool logic 282, 284, and 287 are depicted as different blocks, it will be understood that alternative implementations are possible in which they are integrated together. Furthermore, although in the example of FIGS. 2A-D each of the logic 231, 241, and 251 is depicted as a monolithic block, it will be understood that in some implementations any of the logic 231, 241, and 251 may include multiple processes and/or services that share the same memory pool. For instance, the FS logic 231 may include multiple processes and/or services that draw memory out of the memory pool 216; the cache logic 241 may include multiple processes and/or services that draw memory out of the memory pool 218; and the BSA 250 may include multiple processes and/or services that draw memory out of the memory pool 220. Although in the example of FIGS. 2A-D, each of the extended pool logic 282, 284, and 289 are depicted as integrated into a respective memory management logic, it will be understood that alternative implementations are possible in which the extended pool logic 282, 284, and 289 are implemented separately from any logic that is used to control the allocation of static memory pools (e.g., the memory pools 216, 218, and 220, etc.).

Figure 2E:
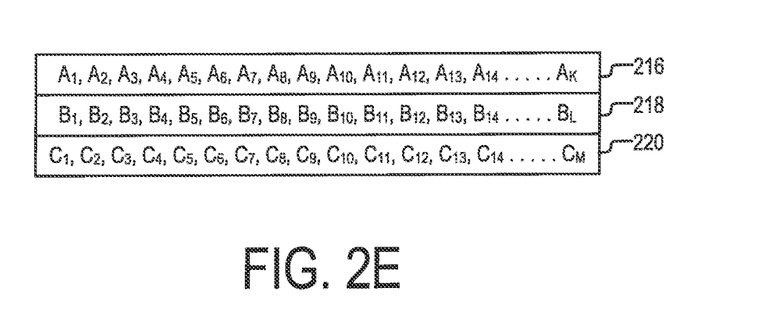
FIG. 2E is a diagram of an example of a plurality of memory buffer, according to aspects of the disclosure.

FIG. 2E shows the memory pools 216, 218, and 220 in further detail. As illustrated, the memory pool 216 may include memory chunks $A_1$ through $A_K$, where K is an integer greater than 14. The memory pool 218 may include memory chunks $B_1$ through $B_L$, where L is an integer greater than 14. And the memory pool 220 may include memory chunks $C_1$ through $C_M$, where M is an integer greater than 14. According to the present example, each of the identified memory chunks includes a single page of memory and is identified by using a single memory address. However, alternative implementations are possible in which any of the memory chunks includes multiple pages of memory and/or is identified by using multiple memory addresses.

Figure 3:
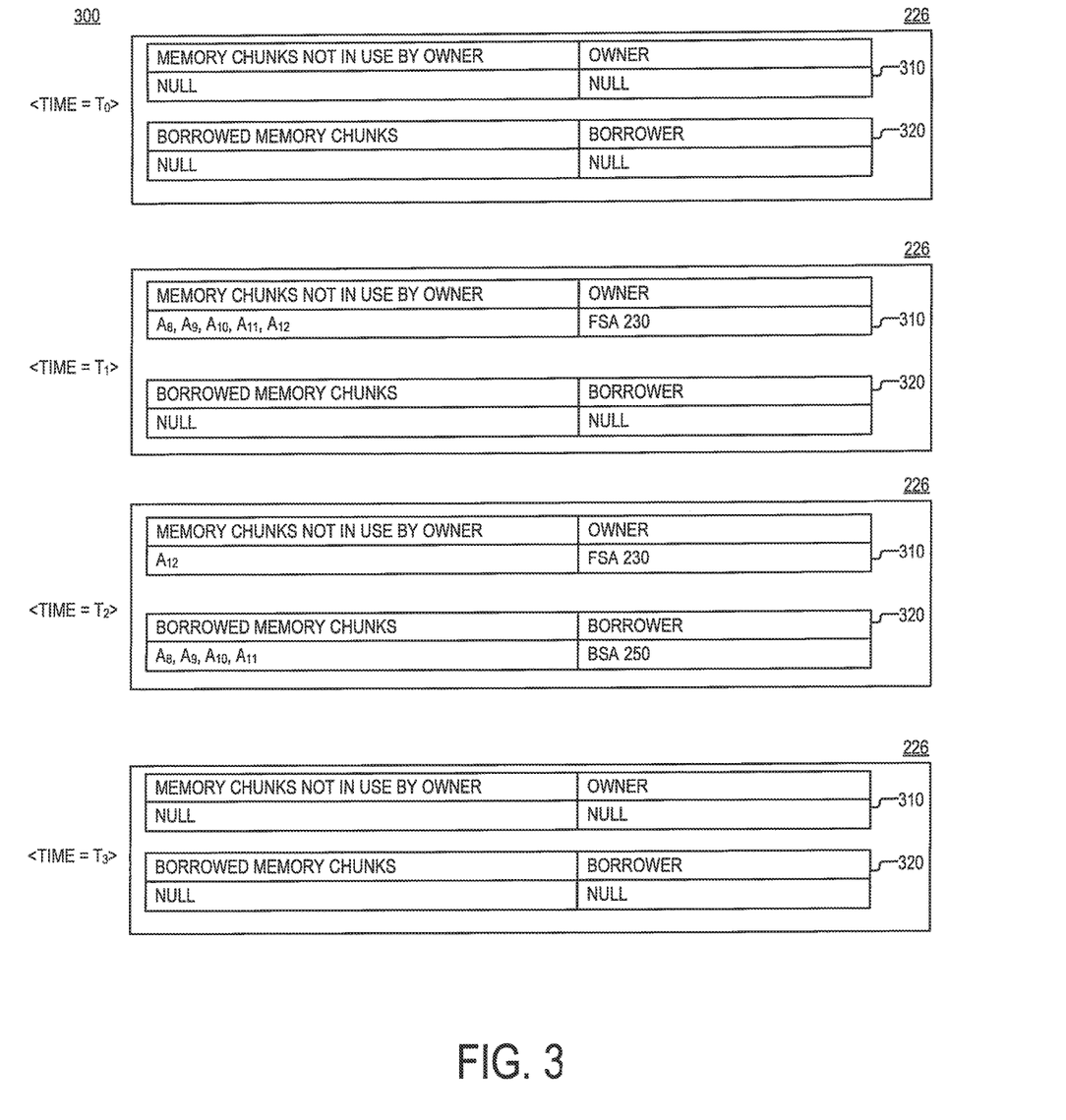
FIG. 3 is a diagram of an example of a process, according to aspects of the disclosure.

FIG. 3 is a diagram illustrating a process 300 for borrowing and reclaiming a portion of an application's memory pool. According to the example of FIG. 3, the process 300 is performed by the DMM 222. However, alternative implementations are possible in which the process 300 is performed by another component of the GMS 210.

At time $T_0$, the DMM 222 instantiates the extended pool data structure 226. As illustrated, the extended pool data structure 226 may include a data structure portion 310 and a data structure portion 320. Although the data structure portion 310 and the data structure portion 320 are depicted as parts of the same data structure, alternative implementations, are possible in which each of the data structure portion 310 and the data structure portion 320 is implemented is part of a different data structure.

At time $T_1$, the DMM 222 receives, from the FSA 230, a notification indicating that the FSA 230 is not using a portion of the memory pool 216. According to the present example, the portion includes memory chunks $A_8$, $A_9$, $A_{10}$, $A_{11}$, and $A_{12}$. In response to the notification, the DMM 222 updates the data structure portion 310 to indicate that the memory chunks $A_8$, $A_9$, $A_{10}$, and $A_{11}$, and $A_{12}$ are available for borrowing by other applications that are executed on the computing device 100 (e.g., the FS cache 240 or the BSA 250, etc.).

At time $T_2$, the DMM 222 receives a request for additional memory from the BSA 250. In response to the request, the DMM 222 assigns the memory chunks $A_8$, $A_9$, $A_{10}$, and $A_{11}$ to the BSA 250. In some implementations, assigning the memory chunks $A_8$, $A_9$, $A_{10}$, and $A_{11}$ may include updating the extended pool data structure 226 to remove identifiers correspond to memory chunks $A_8$, $A_9$, $A_{10}$, and $A_{11}$ from the data structure portion 310, and adding the identifiers corresponding to the memory chunks $A_8$, $A_9$, $A_{10}$, and $A_{11}$ to the data structure portion 320. After the extended pool data structure 226 is updated, the DMM 222 may notify the BSA 250 that memory chunks $A_8$, $A_9$, $A_{10}$, and $A_{11}$ are available for use by the BSA 250.

At time $T_3$, the DMM 222 receives a request to reclaim memory chunks $A_8$, $A_9$, $A_{10}$, $A_{11}$, and $A_{12}$ from the FSA 230. In response to the request, the DMM 222 causes the BSA 250 to release memory chunks $A_8$, $A_9$, $A_{10}$, and $A_{11}$. After the memory chunks $A_8$, $A_9$, $A_{10}$, and $A_{11}$ have been released, the DMM 222 updates the extended pool data structure 260 to indicate that memory chunks $A_8$, $A_9$, $A_{10}$, $A_{11}$, and $A_{12}$ are no longer available for borrowing by other applications. Updating the extended pool data structure 260 may include: (i) removing the identifier for memory chunk $A_{12}$ from the first data structure portion 310, and (ii) removing the identifiers for memory chunks $A_8$, $A_9$, $A_{10}$, and $A_{11}$ from the second data structure portion 320. After the extended pool data structure 226 is updated, the DMM 222 notifies the FSA 230 that memory chunks $A_8$, $A_9$, $A_{10}$, and $A_{11}$ are available for use by the FSA 230.

Although the example of FIG. 3 describes a situation in which only one application declares a portion of its memory pool as available for borrowing by other applications, it will be understood that in some instances multiple applications may declare portion of their memory pools as available for borrowing by other applications. In such instances, the first data structure portion may identify memory chunks that belong to the respective memory pools of different applications. Although in the example of FIG. 3, the request for additional memory is satisfied by borrowing from only one application, it will be understood that in some instances the request may be satisfied by borrowing memory from the respective memory pools of multiple applications.

Figure 4A:
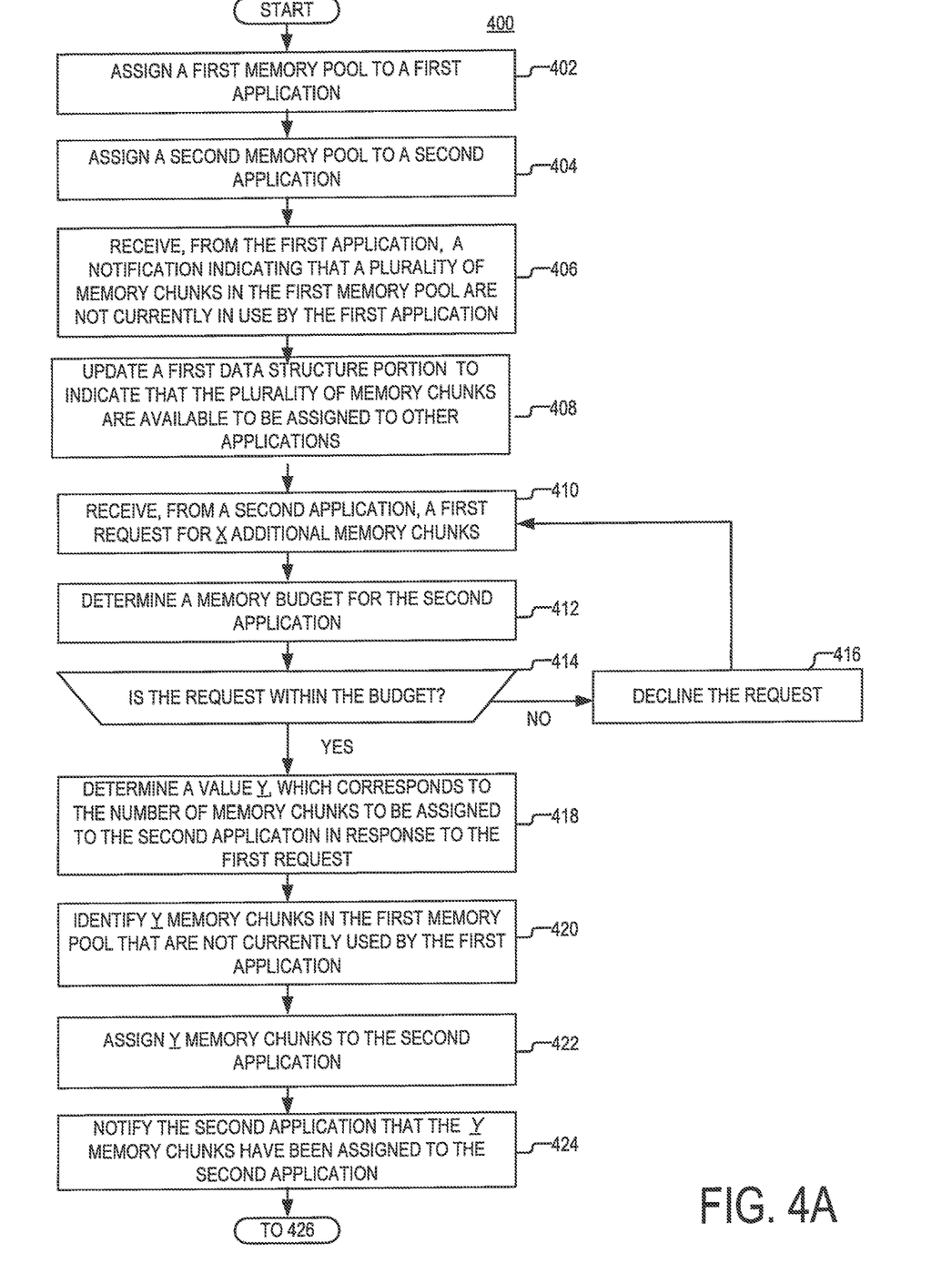
FIG. 4A is a flowchart of a first portion of a process, according to aspects of the disclosure.
Figure 4B:
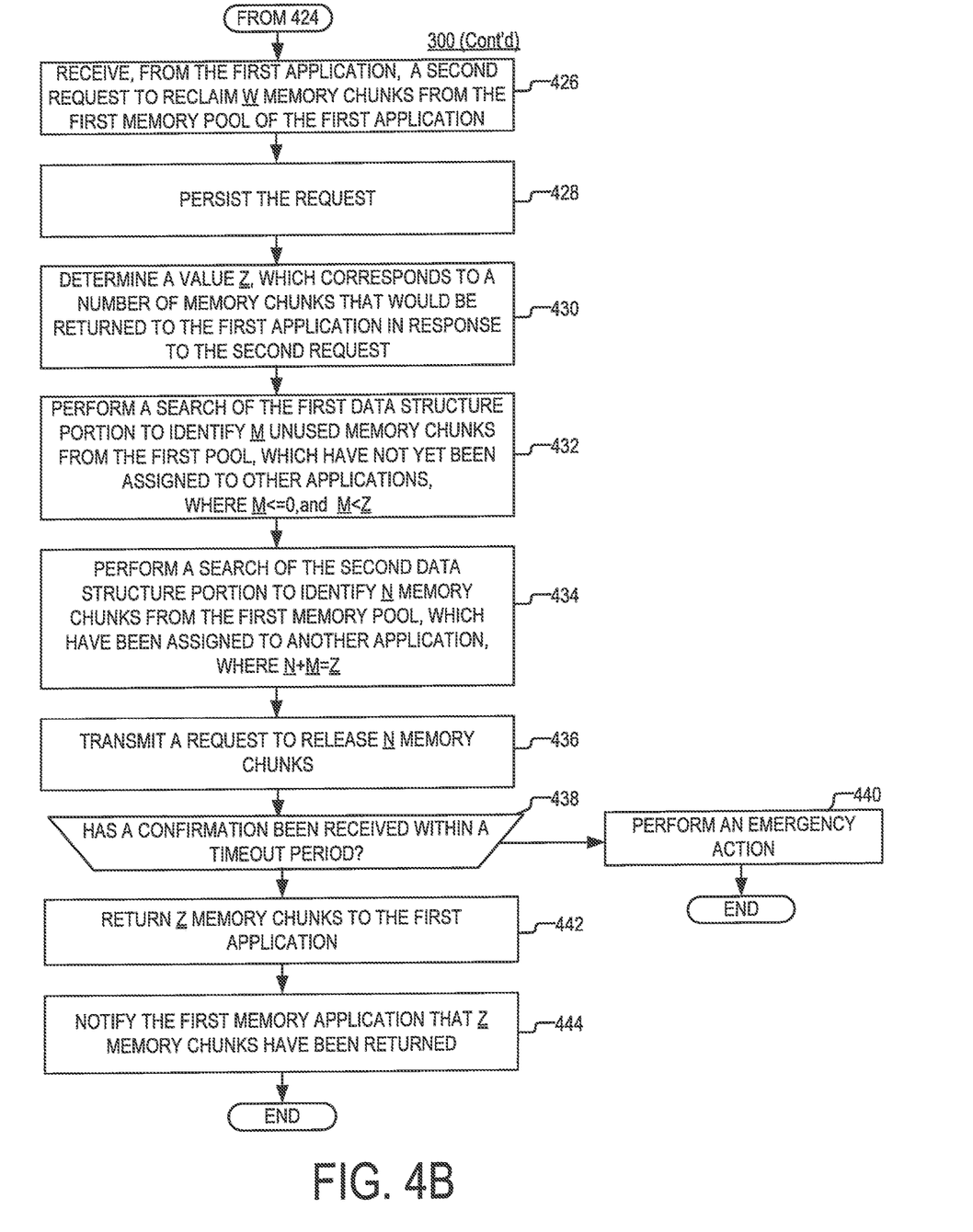
FIG. 4B is a flowchart of a second portion of the process of FIG. 4A, according to aspects of the disclosure.

FIGS. 4A-B show an example of a process 400, according to aspects of the disclosure. According to the present example, the process 400 is executed by a memory management subsystem (MMS) of a commuting device. In some implementations, the MMS may be the same or similar to the GMS 210, which is discussed above with respect to FIG. 2A, and the computing device may be the same or similar to the computing device 100, which is discussed above with respect to FIG. 1. However, it will be understood that the present disclosure is not limited to any specific implementation of the process 400.

At step 402, the MMS receives a request to assign a memory pool to a first application. In response to the request, the MMS instantiates a first memory pool and transmits a notification to the first application that the memory pool has been instantiated. In some implementations, the notification may include a first pool data structure that identifies a plurality of memory chunks that are part of the first memory pool. In some implementations, the first application may be the same or similar to the FSA 230, the first memory pool may be the same or similar to the memory pool 216, and the first pool data structure may be the same or similar to the pool map 234.

At step 404, the MMS receives a request to assign a memory pool to a second application. In response to the request, the MMS instantiates a second memory pool and transmits a notification to the second application that the memory pool has been instantiated. In some implementations, the notification may include a second pool data structure that identifies a plurality of memory chunks that are part of the second memory pool. In some implementations, the second application may be the same or similar to the FS cache 240, the second memory pool may be the same or similar to the memory pool 218, and the memory map may be the same or similar to the pool map 244.

At step 406, the MMS receives a notification from the first application indicating that a portion of the first memory pool is currently not being used by the first application. The portion may include a plurality of memory chunks that are part of the first memory pool. In this regard, in some implementations, the notification may include a plurality of memory chunk identifiers, wherein each one of the memory chunk identifiers corresponds to a respective one of the plurality of memory chunks.

At step 408, the MMS updates a first data structure portion to indicate that the portion of the first memory pool is available for borrowing by applications other than the first application. In some implementations, updating the first data structure portion may include adding the plurality of memory chunk identifiers (received at step 406) to the first data structure portion. In some implementations, the first data structure portion may be the same or similar to the data structure portion 310, which is discussed above with respect to FIG. 3.

At step 410, the MMS receives a request for additional memory from the second application. In some implementations, the request may identify an amount of memory that is requested. According to the present example, the request for additional memory indicates that X memory chunks are being requested by the first application, wherein X is an integer greater than or equal to 1.

At step 412, the MMS identifies a budget for the second application. The identified budget may include the maximum amount of memory that is allowed to be borrowed by the second application from the memory pools of other applications. In some implementations, identifying the budget may include retrieving from a memory of the computing device an indication of the budget. Additionally or alternatively, in some implementations, the budget may be calculated dynamically based on current memory usage by one or more other applications that are being executed by the computing device, and/or any other metric that is indicative of: (i) how much memory is being (or will be) consumed by one or more applications that are executed on the computing device (e.g., the computing device executing the process 400), or (ii) how much memory is (or will be) available for use by one or more applications that are executed by the computing device.

At step 414, the MMS determines if the request is within the budget. In some implementations, determining whether the request is within the budget may include: (i) identifying a first amount of memory that has already been borrowed by the second application from the memory pools of other applications, (ii) identifying a second amount of memory that is requested in the request for additional memory (received at step 410), (iii) calculating the sum of the first amount and the second amount of memory, and (iv) determining if the sum is less than the budget. If the sum is less than the budget, the request is within the budget and the process 400 proceeds to step 418. Otherwise, if the sum exceeds the budget, the request is considered to exceed the budget and the process 400 proceeds to step 416.

At step 416, the MMS notifies the second application that the request for additional memory cannot be completed.

At step 418, the MMS determines a value Y, which corresponds to a count of the memory chunks that would be assigned to the second application in response to the request (received at step 410). The value Y may be an integer that is greater than or equal to X. In some implementations, the MMS may assign additional memory in units that include multiple memory chunks. For example, each of the units may include 256 memory chunks. In such implementations, the value Y may be calculated by rounding up the value X to a multiple of the count of chunks in any of the units. In some respects, assigning more memory chunks than requested may help accommodate future memory demands of the second application, and reduce the frequency at which requests for additional memory (from the second application) would need to be serviced. Reducing the frequency of requests for additional memory may help improve the efficiency of the computing device and reduce any delays that are experienced by the second application while the second application is waiting for additional memory to be assigned to the second application.

At step 420, the MMS performs a search of the first data structure portion to identify Y memory chunks that are available to be borrowed from the memory pools of other applications. According to the present example, the identified memory chunks are part of the first memory pool and include at least some of the memory chunks that are added to the first data structure portion at step 408.

At step 422, the identified Y memory chunks are assigned to the second application. In some implementations, assigning the memory chunks may include deleting a plurality of memory chunk identifiers from the first data structure portion, and adding the plurality of memory chunk identifiers to a second data structure portion. In some implementations, the plurality of memory chunk identifiers may include a different respective memory chunk identifier for each of the assigned memory chunks. In some implementations, the second data structure portion may be the same or similar to the data structure portion 320, that is discussed above with respect to FIG. 3.

At step 424, the second application is notified that Y memory chunks have been assigned to it. In some implementations, the notification may include a plurality of memory chunk identifiers, wherein each of the plurality of memory chunk identifiers corresponds to a respective one of the assigned memory chunks.

At step 426, the MMS receives, from the first memory application, a request to reclaim memory chunks that are borrowed by other applications and/or declared as available for borrowing by other applications. In some implementations, the request may indicate that W memory chunks are desired to be reclaimed, wherein W is an integer greater than or equal to 1. In some implementations, the request may include a list of memory chunk identifiers, wherein each of the memory chunk identifiers corresponds to a different one of the memory chunks that are desired to be reclaimed.

At step 428, the request to reclaim memory chunks is persisted. In some implementations, persisting the request may include storing a copy (or indication) of the request on a backup storage device. In some implementations, when the computing device that executes the process 400 fails, an image of the computing device may be restored on another computing device (hereinafter "failover device"). In this regard, persisting the request would enable the failover device to execute the request in instances in which the computing device (which executes the process 400) fails after the request to reclaim memory chunks is received, but before the request to reclaim memory chunks is executed. As can be readily appreciated, executing the request by the failover device would enable the first application to attain a consistent memory state, following its migration to the failover device.

At step 430, the MMS determines a value Z, which is equal to a count of the memory chunks that would be reclaimed on behalf of the first application. The value Z may be an integer that is greater than or equal to W. In some implementations, the MMS may reclaim memory in units that include multiple memory chunks. In some implementations, the units may include 256 memory chunks. In such implementations, the value Z may be calculated by rounding up the value W to a multiple of the count of memory chunks in any of the units.

At step 432, the MMS performs a search of the first data structure portion to identify M memory chunks (from the first pool) that have been declared by the first application as available for borrowing by other applications, but which have not been borrowed yet. According to the present example, M is an integer that is greater than or equal to 0.

At step 434, the MMS performs a search of the second data structure portion to identify N memory chunks (from the first pool) that have been declared by the first application as available for borrowing, and subsequently borrowed by other applications. According to the present example, N is an integer, such that M+N=Z. According to the present example, all of the memory chunks identified at step 434 are borrowed by the second application.

At step 436, the MMS transmits to the second application, a request to release the identified memory chunks. In some implementations, the request may include a plurality of memory chunk identifiers, wherein each memory chunk identifier corresponds to a different one of the identified memory chunks.

At step 438, the MMS waits for a predetermined timeout period to receive a confirmation that the request transmitted at step 436 has been executed successfully by the second application. If the confirmation is received before the end of the timeout period, the process 400 proceeds to step 442. Otherwise, if no confirmation is received before the end of the timeout period, the process 400 proceeds to step 440.

At step 440, the MMS executes an emergency action. In some implementation, the emergency action may include notifying the first application that the request to reclaim memory chunks that are owned by the first application cannot be completed. Additionally or alternatively, in some implementations, the emergency action may include assigning, to the first application, memory chunks that are owned by a third application. In some implementations, the assignment of the memory chunks that are owned by the third application may be performed by searching the first data structure portion to identify one or more memory chunks (in the pool of other applications) that are available for borrowing by the first application and assigning the identified memory chunks to the first application.

At step 442, the MMS returns the memory chunks identified at steps 432 and 434 to the first application. Returning the memory chunks that are identified at step 432 may include deleting identifier(s) corresponding to the memory chunks from the first data structure portion. Returning the memory chunks that are identified at step 434 may include deleting identifier(s) corresponding to the memory chunks from the second data structure portion.

At step 444, the MMS notifies the first application that the request to reclaim memory chunks has been completed. In some implementations, notifying the second application may include providing the first application with a plurality of memory chunk identifiers, wherein each of the memory chunk identifiers corresponds to a respective one of the memory chunks identified at steps 432 and 434.

Steps 402-424 show an example of a sequence in which a request for additional memory is received and subsequently fulfilled by borrowing memory from the memory pool of only one application. However, it will be understood that alternative implementations are possible in which the request is fulfilled by borrowing memory chunks from the memory pools of multiple applications. In such implementations, multiple applications may declare that memory chunks in their memory pools are available for borrowing (at step 406), and identifiers corresponding to their available memory chunks may be added to the first data structure portion (at step 408).

Steps 426-444 show an example of a sequence in which memory owned by the first application is reclaimed in response to a request that is submitted by the first application. In response of the request, memory chunks identified by the second application are identified (at step 434) and subsequently reclaimed. Although in the example of FIG. 4, memory chunks borrowed by only one application (i.e., the second application) are identified at step 434, and alternative implementations are possible in which memory chunks borrowed by different applications are identified. In such implementations, a different request to release borrowed memory chunks may be sent to each of the "borrower" applications.

Steps 426-444 show an example of a sequence in which memory owned by the first application is reclaimed in response to a request that is submitted by the first application. However, it will be understood that alternative implementations are possible in which memory owned by the first application is reclaimed proactively, without there being an explicit request from the first application. In such implementations, the MMS may (intermittently) calculate the total amount of memory that is borrowed from the first application by other applications (and/or declared as available for borrowing from the first application). Next, the MMS may determine whether the determined amount of memory exceeds a maximum threshold amount. If the maximum threshold amount is exceeded, the MMS may determine the difference between the total amount and the maximum threshold amount. Afterwards, the MMS may reclaim a plurality of memory chunks that are owned by the first application, and whose combined capacity is greater than or equal to the difference between the determined amount and the maximum threshold amount.

Figure 5:
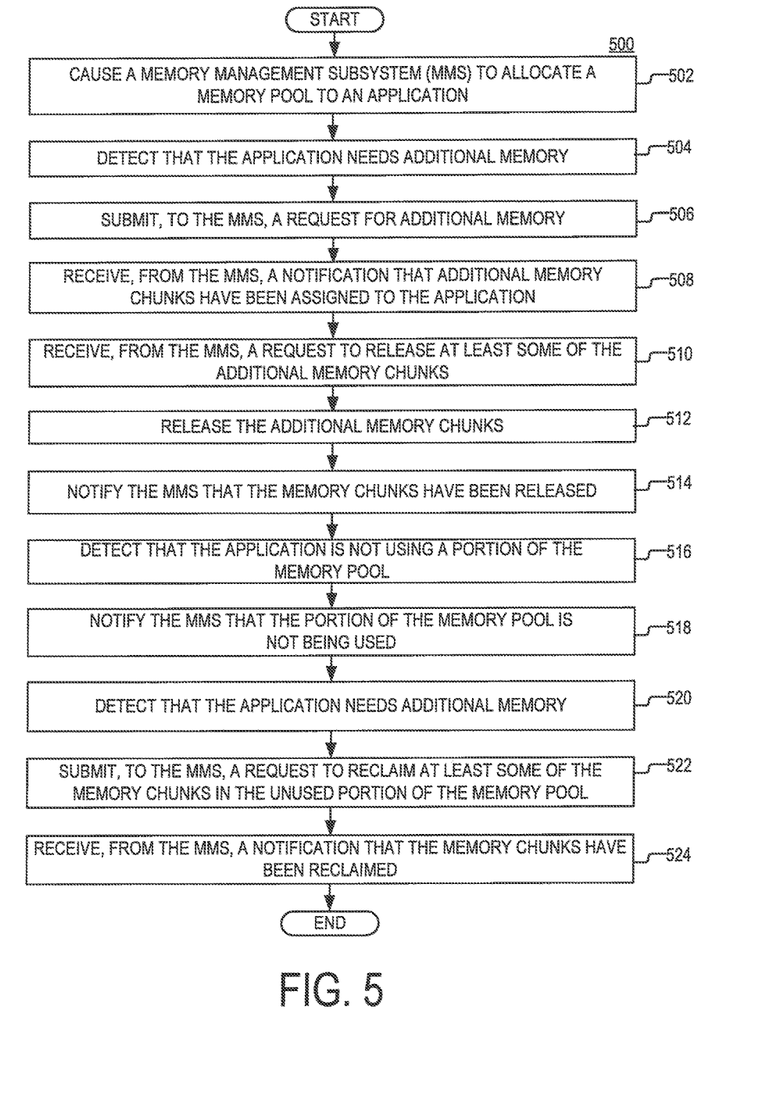
FIG. 5 is a flowchart of an example of a process, according to aspects of the disclosure.

FIG. 5 is a flowchart of an example of a process 500, according to aspects of the disclosure. In some implementations, the process 500 may be performed by the same computing device as the process 500. Additionally or alternatively, in some implementations, the process 500 may be performed by a memory management logic (MML) of an application. In some implementations, the MML may be the same or similar to any of the memory management logic 232, 242, and 244. However, it will be understood that the present disclosure is not limited to any specific implementation of the process 500.

At step 502, the MML causes an MMS to allocate a memory pool to an application. The application may be the same or similar to any of the applications, 230, 240, and 250. In some implementations, causing the MMS to allocate the memory pool may include transmitting to the MMS a request to allocate the memory pool and receiving a confirmation that the memory pool has been allocated in response to the request. In some implementations, the confirmation may include a list of memory chunk identifiers that correspond to the memory pool. In response to receiving the list, the MML may update a pool map corresponding to the application to include the plurality of memory chunk identifiers. The pool map may be the same or similar to any of the pool maps 234, 244, and 246.

At step 504, the MML detects that the application needs additional memory. In some implementations, the MML may detect an event that is generated by one or more components of the application. The event may signal that the application needs additional memory. In some implementations, the event may identify a count of X memory chunks that is desired to be received, wherein X is an integer greater than or equal to 1. At step 506, the MML submits, to the MMS, a request for X memory chunks.

At step 508, the MML receives, from the MMS, a notification indicating that Y memory chunks have been assigned to the application, wherein Y is an integer greater than or equal to X. The notification may include a plurality of memory chunk identifiers, wherein each of the memory chunk identifiers corresponds to a different one of the assigned memory chunks. When the notification is received, the MML may update an extended pool map that corresponds to the application. The extended pool map may be updated to include the plurality of memory chunk identifiers. Updating the extended pool map may cause the application to recognize the memory chunks as being available for use by the application. In some implementations, the extended pool map may be the same or similar to any of the extended pool maps 236, 246, and 256.

At step 510, the MML receives, from the MMS, a request to release at least some of the assigned memory chunks. In some implementations, the request may include a plurality of unused memory chunk identifiers, wherein each of the memory chunk identifiers corresponds to a different one of the memory chunks that are desired to be released. At step 512, the MML causes the application to release the memory chunks whose release is desired. In some implementations, the MML may generate an event, which, when detected by one or more components of the application, causes the application to stop using the memory chunks that are desired to be released. At step 514, the MML notifies the MMS that the memory chunks have been released. In some implementations, at step 514, when the memory chunks are released, the MML may update the extended pool map to remove memory chunk identifiers corresponding to the released memory chunks. Updating the extended pool map in this way may cause the application to recognize that the memory chunks are no longer available for use by the application.

At step 516, the MML detects that the application is not currently using a portion of the memory pool (allocated at step 502). In some implementations, the detection may be performed based on an event that is generated by the application, which identifies a plurality of memory chunks from the first pool. At step 518, the MML submits, to the MMS, a notification indicating that the portion of the memory pool is not currently being used. At step 520, the MMS transmits to the MMS a notification that the portion of the memory pool is not being used. In some implementations, the notification may include a plurality of memory chunk identifiers, wherein each of the memory chunk identifiers corresponds to a respective one of the unused memory chunks. In some implementations, when the notification is submitted, the MML may update the memory pool map to indicate that the memory chunks (which are declared as not being used by the application) can no longer be used by the application. At step 522, the MML detects that the application needs additional memory. At step 524, the MML submits, to the MMS, a request to reclaim at least some of the memory chunks in the portion that is identified as not being used (at step 516). In some implementations, the request may include a plurality of memory chunk identifiers, where each of the memory chunk identifiers corresponds to a different memory chunk that is desired to be reclaimed. At step 526, the MML receives from the MMS a confirmation that the memory chunks have been reclaimed. In response to receiving the confirmation, the MML may update the memory pool map to indicate that the reclaimed memory chunks are again available for use by the application.

FIGS. 1-5 are provided as an example only. At least some of the steps discussed with respect to FIGS. 1-5 may be performed in parallel, in a different order, or altogether omitted. As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method comprising:
   allocating a first memory pool and a second memory pool, the first memory pool being allocated to a first application, and the second memory pool being allocated to a second application;
   receiving a first request for additional memory, the first request being submitted by the second application;
   assigning a portion of the first memory pool to the second application, the portion of the first memory pool including a set of memory chunks that are part of the first memory pool, the assigning of the portion including updating a first data structure portion to associate the second application with set of memory chunks; and
   notifying the second application that the portion of the first memory pool has been assigned to the second application,
   wherein assigning the portion of the first memory pool to the second application includes assigning more memory chunks than requested by the second application to accommodate future memory needs of the second application.

2. The method of claim 1, further comprising:
   receiving, from the first application, an indication that a plurality of memory chunks in the first memory pool are not being used by the first application;
   updating a second data structure portion to indicate that the plurality of memory chunks in the first memory pool is available for use by other applications,
   wherein the set of memory chunks includes at least some of the plurality of memory chunks, and the set of memory chunks is identified based on the second data structure portion.

3. The method of claim 2, wherein the first data structure portion and the second data structure portion are either part of the same data structure or part of different data structures.

4. The method of claim 1, further comprising detecting whether a count of memory chunks that is specified by the first request meets a budget corresponding to the second application, wherein the portion of the first memory pool is assigned to the second application only when the count of memory chunks specified by the first request meets the budget.

5. The method of claim 1, further comprising:
   receiving a second request to reclaim the portion of the first memory pool that is assigned to the second application, the second request being submitted by the first application;
   causing the second application to release the portion of the first memory pool that is assigned to the second application;
   updating the first data structure portion to remove one or more associations between the second application and the portion of the first memory pool, and
   notifying the first application that the portion of the first memory pool has been returned to the first application.

6. The method of claim 5, further comprising persisting the second request before the portion of the first memory pool is assigned back to the first application.

7. A system, comprising:
   a memory; and
   one or more processors operatively coupled to the memory, the one or more processors being configured execute a memory management system, the memory management subsystem being configured to perform the operations of:
   allocating a first memory pool and a second memory pool, the first memory pool being allocated to a first application, and the second memory pool being allocated to a second application;
   receiving a first request for additional memory, the first request being submitted by the second application;
   assigning a portion of the first memory pool to the second application, the portion of the first memory pool including a set of memory chunks that are part of the first memory pool, the assigning of the portion including updating a first data structure portion to associate the second application with set of memory chunks; and
   notifying the second application that the portion of the first memory pool has been assigned to the second application,
   wherein assigning the portion of the first memory pool to the second application includes assigning more memory chunks than requested by the second application to accommodate future memory needs of the second application.

8. The system of claim 7, wherein the memory management subsystem is further configured to perform the operations of:
   receiving, from the first application, an indication that a plurality of memory chunks in the first memory pool are not being used by the first application;
   updating a second data structure portion to indicate that the plurality of memory chunks in the first memory pool is available for use by other applications; and
   identifying the set of memory chunks based on the second data structure portion.

9. The system of claim 8, wherein the first data structure portion and the second data structure portion are either part of the same data structure or part of different data structures.

10. The system of claim 7, wherein the memory management subsystem is further configured to perform the operation of detecting whether a count of memory chunks that is specified by the first request meets a budget corresponding to the second application, and the portion of the first memory pool is assigned to the second application only when the count of memory chunks specified by the first request meets the budget.

11. The system of claim 7, the memory management subsystem is further configured to the operations of:
   receiving a second request to reclaim the portion of the first memory pool that is assigned to the second application, the second request being submitted by the first application;

causing the second application to release the portion of the first memory pool that is assigned to the second application;

updating the first data structure portion to remove one or more associations between the second application and the portion of the first memory pool, and notifying the first application that the portion of the first memory pool has been returned to the first application.

12. The system of claim 11, wherein the memory management subsystem is further configured to configured to perform the operation of persisting the second request before the portion of the first memory pool is assigned back to the first application.

13. A non-transitory computer-readable medium storing one or more processor-executable instructions, which when executed by at least one processor cause the at least one processor to perform the operations of:

allocating a first memory pool and a second memory pool, the first memory pool being allocated to a first application, and the second memory pool being allocated to a second application;

receiving a first request for additional memory, the first request being submitted by the second application;

assigning a portion of the first memory pool to the second application, the portion of the first memory pool including a set of memory chunks that are part of the first memory pool, the assigning of the portion including updating a first data structure portion to associate the second application with set of memory chunks; and notifying the second application that the portion of the first memory pool has been assigned to the second application, wherein assigning the portion of the first memory pool to the second application includes assigning more memory chunks than requested by the second application to accommodate future memory needs of the second application.

14. The non-transitory computer-readable medium of claim 13, wherein the one or more processor-executable instructions, when executed by the at least one processor, further cause the at least one processor to perform the operations of:

receiving, from the first application, an indication that a plurality of memory chunks in the first memory pool are not being used by the first application;

updating a second data structure portion to indicate that the plurality of memory chunks in the first memory pool is available for use by other applications, wherein the set of memory chunks includes at least some of the plurality of memory chunks, and the set of memory chunks is identified based on the second data structure portion.

15. The non-transitory computer-readable medium of claim 14, wherein the first data structure portion and the second data structure portion are either part of the same data structure or part of different data structures.

16. The non-transitory computer-readable medium of claim 13, wherein the one or more processor-executable instructions, when executed by the at least one processor, further cause the at least one processor to perform the operation of: detecting whether a count of memory chunks that is specified by the first request meets a budget corresponding to the second application, wherein the portion of the first memory pool is assigned to the second application only when the count of memory chunks specified by the first request meets the budget.

17. The non-transitory computer-readable medium of claim 13, wherein the one or more processor-executable instructions, when executed by the at least one processor, further cause the at least one processor to perform the operations of:

receiving a second request to reclaim the portion of the first memory pool that is assigned to the second application, the second request being submitted by the first application;

causing the second application to release the portion of the first memory pool that is assigned to the second application;

updating the first data structure portion to remove one or more associations between the second application and the portion of the first memory pool, and notifying the first application that the portion of the first memory pool has been returned to the first application.

* * * * *